US008588947B2

(12) United States Patent
Oh et al.

(10) Patent No.: US 8,588,947 B2
(45) Date of Patent: Nov. 19, 2013

(54) APPARATUS FOR PROCESSING AN AUDIO SIGNAL AND METHOD THEREOF

(75) Inventors: Hyen-O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 602 days.

(21) Appl. No.: 12/578,235

(22) Filed: Oct. 13, 2009

(65) Prior Publication Data

US 2010/0094443 A1 Apr. 15, 2010

Related U.S. Application Data

(60) Provisional application No. 61/105,014, filed on Oct. 13, 2008.

(51) Int. Cl.
*G06F 17/00* (2006.01)
(52) U.S. Cl.
USPC .......... 700/94; 381/1; 381/2; 381/17; 381/18; 381/19; 381/20; 381/21; 381/22; 381/23; 386/285; 386/321; 386/337; 386/338; 386/339; 369/4; 369/5
(58) Field of Classification Search
USPC .............. 370/260–267; 381/1, 2, 19–23; 379/93.21, 158, 202.01–206.01; 700/94
See application file for complete search history.

(56) References Cited

U.S. PATENT DOCUMENTS

| 4,815,132 A * | 3/1989 | Minami .......................... 381/1 |
| 5,373,549 A * | 12/1994 | Bales et al. ................. 379/93.21 |
| 5,898,676 A * | 4/1999 | Apfelbeck et al. ............ 370/260 |
| 6,178,237 B1 * | 1/2001 | Horn ........................ 379/202.01 |

* cited by examiner

*Primary Examiner* — Paul McCord
(74) *Attorney, Agent, or Firm* — Birch, Stewart, Kolasch & Birch, LLP

(57) ABSTRACT

An apparatus for processing an audio signal and method thereof are disclosed. The present invention includes an apparatus for a processing a signal, the apparatus comprising: a wire/wireless communication unit receiving object information and an audio signal which comprises multiple object groups from a multipoint control unit; a signal coding unit obtaining object group information by decoding the object information; a display unit displaying the object group information; and, an input unit receiving selection command designating at least one object group as non-recipient terminal among multiple object groups, based on the object group information; wherein, when the selection command is received, the signal coding unit generates destination information using the selection command, wherein, when the destination information is generated, the wire/wireless communication unit transmits the destination information to the multiple control unit, wherein the multiple object groups comprise first object group of first terminal and second object group of second terminal.

9 Claims, 16 Drawing Sheets

(A)  Terminal A (B)  Terminal B (C)  Terminal C (A)

(B)

though the present invention is suitable for a wide scope of applications, it is particularly suitable for processing an audio signal received from a multipoint and then transmitting the processed audio signal to the multipoint.

APPARATUS FOR PROCESSING AN AUDIO SIGNAL AND METHOD THEREOF

This application claims the benefit of U.S. Provisional Application No. 61/105,014 filed on Oct. 13, 2008, which are hereby incorporated by reference.

BACKGROUND OF THE INVENTION

1. Field of the Invention

The present invention relates to an apparatus for processing an audio signal and method thereof. Although the present invention is suitable for a wide scope of applications, it is particularly suitable for processing an audio signal received from a multipoint and then transmitting the processed audio signal to the multipoint.

2. Discussion of the Related Art

Generally, in performing a teleconference or a phone conference, a multipoint control unit receives audio signals from at least three points or terminals, excludes the audio signal received from a specific one of the terminals from the received audio signals, combines the rest of the signals together, and then transmits the combined signal to the specific terminal.

However, in this case, since the multipoint control unit needs to generate and transmit audio signals differing from each other according to each receiving terminal by real time, an operational throughput necessary to be handled is very high.

Moreover, a terminal of a recipient is unable to separately control a level or the like of an audio signal of a specific one of at least two originators.

SUMMARY OF THE INVENTION

Accordingly, the present invention is directed to an apparatus for processing an audio signal and method thereof that substantially obviate one or more problems due to limitations and disadvantages of the related art.

An object of the present invention is to provide an apparatus for processing an audio signal based on object coding and method thereof, by which a level and virtual position of a signal of a specific terminal or speaker can be controlled in a teleconference.

Another object of the present invention is to provide an apparatus for processing an audio signal and method thereof, by which a whisper chat function of restricting a reception of a specific terminal temporarily can be implemented in a teleconference.

Another object of the present invention is to provide an apparatus for processing an audio signal and method thereof, by which one same signal is generated irrespective of a receiving terminal and can be indiscriminately transmitted to all receiving terminals without generating a different audio signal for each receiving terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing an audio signal, comprising: receiving a first audio signal and first object information from a first terminal; receiving a second audio signal and second object information from a second terminal; receiving a third audio signal and third object information from a third terminal; when destination information designating at least one non-recipient terminal among multiple terminals including the second terminal and the third terminal is received from the first terminal, generating a designated object information for the non-recipient terminal by combining multiple object information without the first object information according to the destination information; when the designated object information is generated, transmitting the designated object information to the non-recipient terminal among the multiple terminals; when the destination information is not received from the first terminal, generating a universal object information for the multiple terminals by combining multiple object information including the first object information, the second object information and the third object information; and, when the universal object information is generated, transmitting the universal object information to the multiple terminals.

According to the present invention, the first audio signal comprises a first object group including at least one object signal, wherein the first object information is generated when the first object group is downmixed into the first audio signal, and, wherein the first object information, the designated object information and the universal object information comprise at least one of object level information, object correlation information, downmix gain information, downmix channel level difference, and absolute object energy information.

According to the present invention, the method further comprises when the destination information is not received from the first terminal, generating a universal audio signal by combining multiple audio signals including the first audio signal, the second audio signal and the third audio signal, transmitting the universal audio signal to the multiple terminals.

According to the present invention, the method further comprises generating control parameter comprising at least one of downmix combination information, mapping information and downmix mode information; and, wherein the designated object information and the universal object information are generated based on the control parameter.

In another aspect of the present invention, an apparatus for processing an audio signal, comprising: a receiving unit receiving a first audio signal and first object information from a first terminal, receiving a second audio signal and second object information from a second terminal, and receiving a third audio signal and third object information from a third terminal; a first combining unit, when destination information designating at least one non-recipient terminal among multiple terminals including the second terminal and the third terminal is received from the first terminal, generating a designated object information for the non-recipient terminal by combining multiple object information without the first object information according to the destination information, and transmitting the designated object information to the non-recipient terminal among the multiple terminals; and, a second combining unit, when the destination information is not received from the first terminal, generating a universal object information for the multiple terminals by combining multiple object information including the first object information, the second object information and the third object information; and, transmitting the universal object information to the multiple terminals is provided.

According to the present invention, the first audio signal comprises a first object group including at least one object signal, wherein the first object information is generated when the first object group is downmixed into the first audio signal, and, wherein the first object information, the designated object information and the universal object information comprise at least one of object level information, object correlation information, downmix gain information, downmix channel level difference, and absolute object energy information.

According to the present invention, the second combining unit, when the destination information is not received from the first terminal, generates a universal audio signal by combining multiple audio signals including the first audio signal, the second audio signal and the third audio signal, and transmits the universal audio signal to the multiple terminals.

According to the present invention, the apparatus further comprises: a control unit generating control parameter comprising at least one of downmix combination information, mapping information and downmix mode information; and, wherein the designated object information and the universal object information are generated based on the control parameter.

In another aspect of the present invention, a computer-readable medium comprising instructions stored thereon, which, when executed by a processor, causes the processor to perform operations, the instructions comprising: receiving a first audio signal and first object information from a first terminal; receiving a second audio signal and second object information from a second terminal; receiving a third audio signal and third object information from a third terminal; when destination information designating at least one non-recipient terminal among multiple terminals including the second terminal and the third terminal is received from the first terminal, generating a designated object information for the non-recipient terminal by combining multiple object information without the first object information according to the destination information; when the designated object information is generated, transmitting the designated object information to the non-recipient terminal among the multiple terminals; when the destination information is not received from the first terminal, generating a universal object information for the multiple terminals by combining multiple object information including the first object information, the second object information and the third object information; and, when the universal object information is generated, transmitting the universal object information to the multiple terminals is provided.

In another aspect of the present invention, an apparatus for a processing a signal, the apparatus comprising: a wire/wireless communication unit receiving object information and an audio signal which comprises multiple object groups from a multipoint control unit; a signal coding unit obtaining object group information by decoding the object information; a display unit displaying the object group information; and, an input unit receiving selection command designating at least one object group as non-recipient terminal among multiple object groups, based on the object group information; wherein, when the selection command is received, the signal coding unit generates destination information using the selection command, wherein, when the destination information is generated, the wire/wireless communication unit transmits the destination information to the multiple control unit, wherein the multiple object groups comprise first object group of first terminal and second object group of second terminal.

According to the present invention, the object information corresponds to either designated object information or universal object information, and the audio signal corresponds to either a designated audio signal or universal audio signal.

According to the present invention, the object group information comprises terminal name of the first terminal, object name of at least one object included in the first object group, and terminal name of the second terminal, object name of at least one object included in the second object group.

According to the present invention, the object group information is obtained from metadata area of the object information. In another aspect of the present invention, a method for a processing a signal, the method comprising: receiving object information and an audio signal which comprises multiple object groups from a multipoint control unit; obtaining object group information by decoding the object information; displaying the object group information; and, receiving selection command designating at least one object group as non-recipient terminal among multiple object groups, based on the object group information; generating destination information using the selection command; and, transmitting the destination information to the multiple control unit, wherein the multiple object groups comprise first object group of first terminal and second object group of second terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

The following terminologies in the present invention can be construed based on the following criteria and other terminologies failing to be explained can be construed according to the following purposes. First of all, it is understood that the concept 'coding' in the present invention can be construed as either encoding or decoding in case. Secondly, 'information' in this disclosure is the terminology that generally includes values, parameters, coefficients, elements and the like and its meaning can be construed as different occasionally, by which the present invention is non-limited.

In this disclosure, in a broad sense, an audio signal is conceptionally discriminated from a video signal and designates all kinds of signals that can be auditorily identified. In a narrow sense, the audio signal means a signal having none or small quantity of speech characteristics. Audio signal of the present invention should be construed in a broad sense. And, the audio signal of the present invention can be understood as a narrow-sense audio signal in case of being used by being discriminated from a speech signal.

Figure 1:
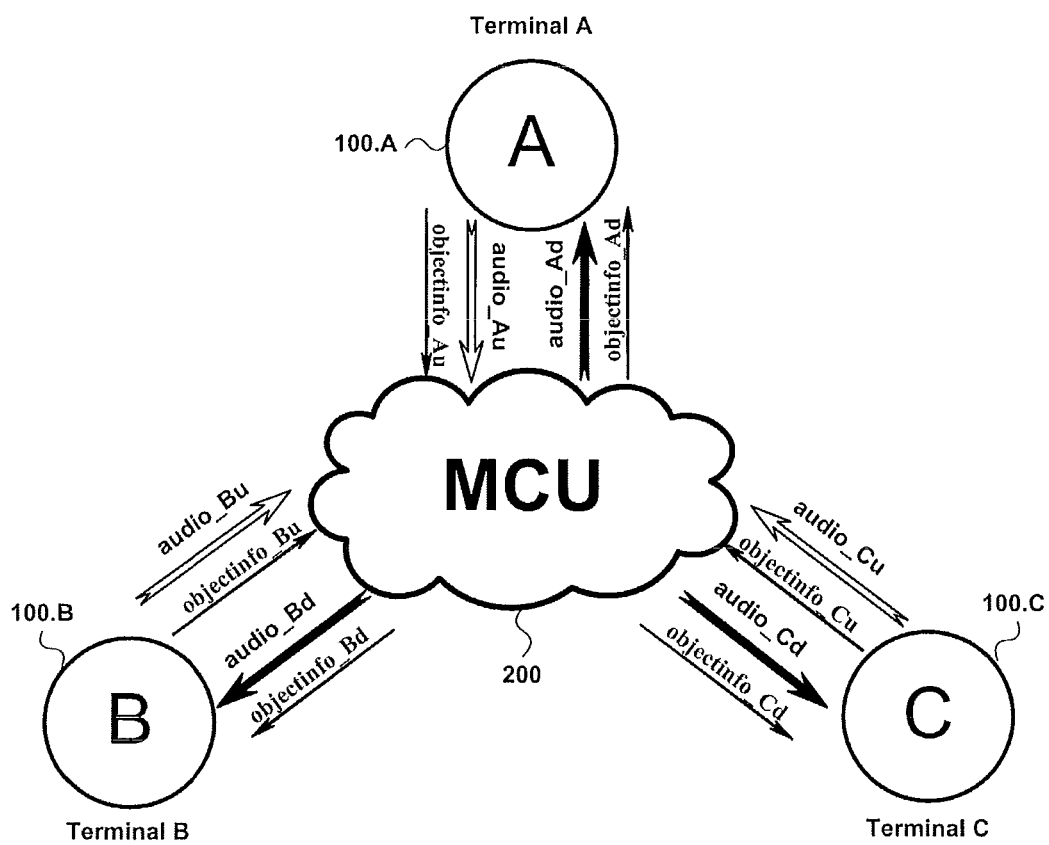
FIG. 1 is a diagram for a concept of an object coding based teleconference and a multipoint control unit according to an embodiment of the present invention.
Figure 2:
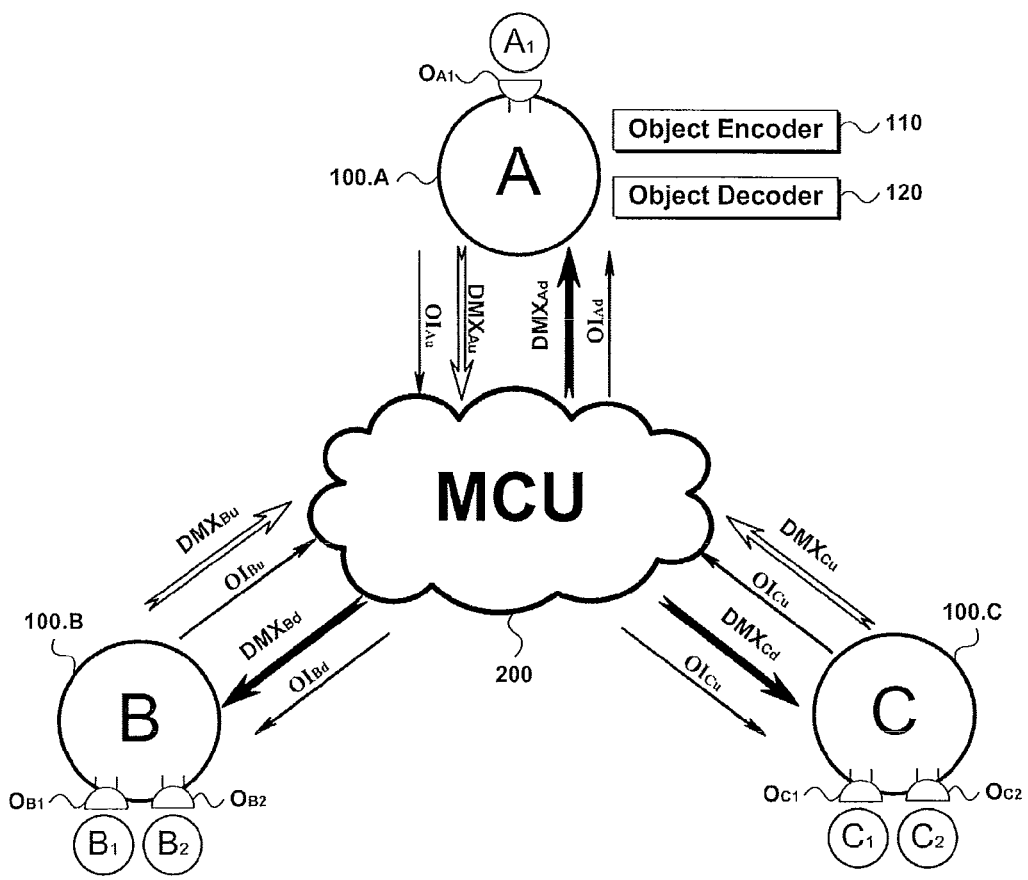
FIG. 2 is a detailed diagram of FIG. 1.

FIG. 1 is a diagram for a concept of an object coding based teleconference and a multipoint control unit according to an embodiment of the present invention, and FIG. 2 is a detailed diagram of FIG. 1.

Referring to FIG. 1, a multipoint control unit (MCU) 200 is connected to several terminals including a terminal A 100.A, a terminal B 100.B and a terminal C 100.C via wire/wireless communication networks. The terminal A 100.A generates an audio signal audio_Au and object information objectinfo_Au and then transmits them to the multipoint control unit 200. The terminal A 100.A receives an audio signal audio_Ad and object information objectinfo_Ad from the multipoint control unit 200. Likewise, each of the terminal B 100.B and the terminal C 100.C generates an audio signal and object information, transmits them to the multipoint control unit 200, and then receives an audio signal and object information from the multipoint control unit 200.

In this case, the audio signal audio_Au generated by the terminal A is a signal generated from downmixing at least one object signal and the object information objectinfo_Au is the information generated when the at least one object signal is downmixed. Meanwhile, the object signal may include a speech of a speaker, which is received from a specific microphone. This will be explained in detail later.

Referring to FIG. 2, there exist a multipoint control unit 200, a terminal A 100.A, a terminal B 100.b and a terminal C 100.c exist in the same manner shown in FIG. 1. Meanwhile, the terminal A 100.A transmits an audio signal $DMX_{Au}$ and object information $OI_{Au}$ in uplink to the multipoint control unit 200, whereas the multipoint control unit 200 transmits an audio signal $DMX_{Ad}$ and uplink object information $OI_{Ad}$ in downlink to the terminal A 100.A, as shown in FIG. 1. The audio signal $DMX_{Au}/DMX_{Bu}/DMX_{Cu}$ and object information $OI_{Au}/OI_{Bu}/OI_{Cu}$ transmitted in uplink to the multipoint control unit 200 from each of the terminals vary according to each of the terminals. On the contrary, the audio signal $DMX_{Ad}/DMX_{Bd}/DMX_{Cd}$ and object information $OI_{Ad}/OI_{Bd}/OI_{Cd}$ generated by the multipoint control unit 200 can become a designated audio signal and designated object information varying according to each terminal in case of a whisper chat mode. In case of MCU simple mode, they can become a same universal audio signal and universal object information irrespective of a receiving terminal. The multipoint control unit, which performs the whisper chat mode or the MCU simple mode, will be explained with reference to FIGS. 4 to 8 later.

Each of the terminals A, B and C includes an object encoder 110 and an object decoder 120. Each of the terminals can decode an audio signal per object using the object information from the MCU. In this case, the object can include a signal $DMX_{Au}/DMX_{Bu}/DMX_{Cu}$, transmitted to the multipoint control unit 200 by being generated from a specific terminal. Besides, at least two signals can be inputted to a specific terminal In this case, an object can include each of the input signals. The signal inputted to the specific terminal can include a speech signal of each speaker if there are multiple speakers that use the same terminal at the same point. And, at least one or more signals inputted to a specific terminal can be entirely named an object group.

Referring to FIG. 2, one speaker A1 exists at a terminal A. Two speakers B1 and B2 exist at a terminal B. And, two speakers C1 and C2 exist at a terminal C as well. In particular, as at least two microphones are provided to one terminal, signals of at least two speakers are handled as object signals, respectively. For instance, speeches of the speakers B1 and B2 in the terminal B are two object signals $O_{B1}$ and $O_{B2}$ and are inputted as a second object group to the terminal B.

Thus, each of the terminals includes the object encoder 110 and the object decoder 120 to process a signal of a specific terminal or speaker into an object. The object encoder 110 will be explained in detail with reference to FIG. 3, and the object decoder 120 will be explained in detail with reference to FIGS. 9 to 11.

Figure 3:
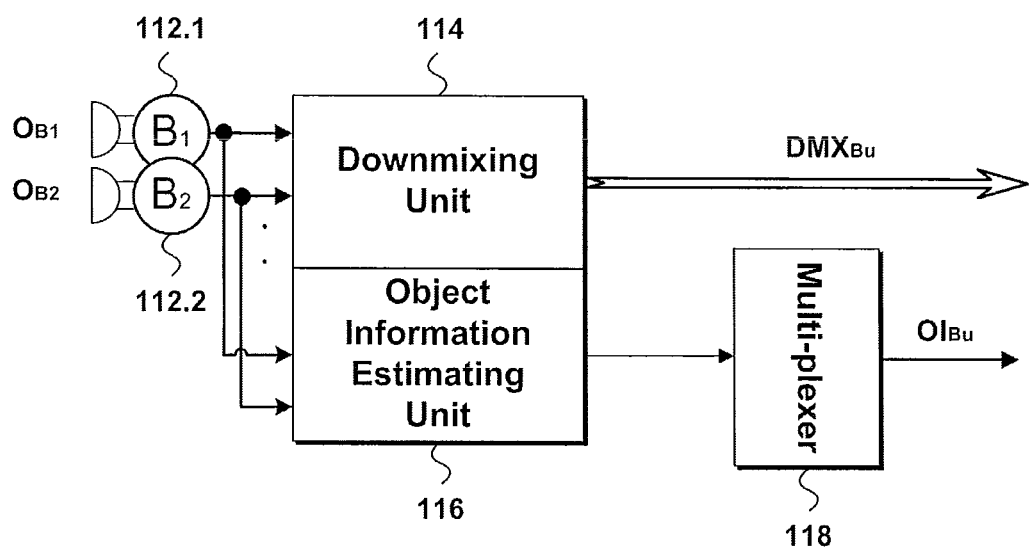
FIG. 3 is a block diagram of an object encoder according to an embodiment of the present invention.

FIG. 3 is a block diagram of an object encoder according to an embodiment of the present invention.

Referring to FIG. 3, an object encoder 110 includes at least one or more microphones 112.1 and 112.2, a downmixing unit 114, an object information estimating unit 116 and a multiplexer 118.

The microphones 112.1 and 112.2 are input means for receiving inputs of speech signals of speakers (or dialogists, caller) B1 and B2 using the same terminal as object signals $O_{B1}$ and $O_{B2}$, respectively, and wire/wireless communication modules can be substituted for the input means. In this case, the speech signal of the speaker is just exemplary. And, it is understood that every sound source such as a musical instrument sound of piano, cello or violin, an artificial sound and the like can become an object signal.

The downmixing unit 114 generates an audio signal $DMX_{Bu}$ for uplink by downmixing at least one object signal received from the microphone or the communication module. As mentioned in the foregoing description, this signal is the signal to be transmitted to the multipoint control unit.

The object information estimating unit 116 generates object information $OI_{Bu}$ when the downmixing unit 114 downmixes at least one object signal. The object information $OI_{Bu}$ includes object level information and object correlation information and can further include downmix gain information, downmix channel level difference and absolute object energy information if necessary. The multiplexer 118 generates an object bitstream by multiplexing the object information. Thus, the audio signal $DMX_{Bu}$ and object information $OI_{Bu}$ generated by the object encoder 110 are transmitted to the multipoint control unit 200.

Figure 4:
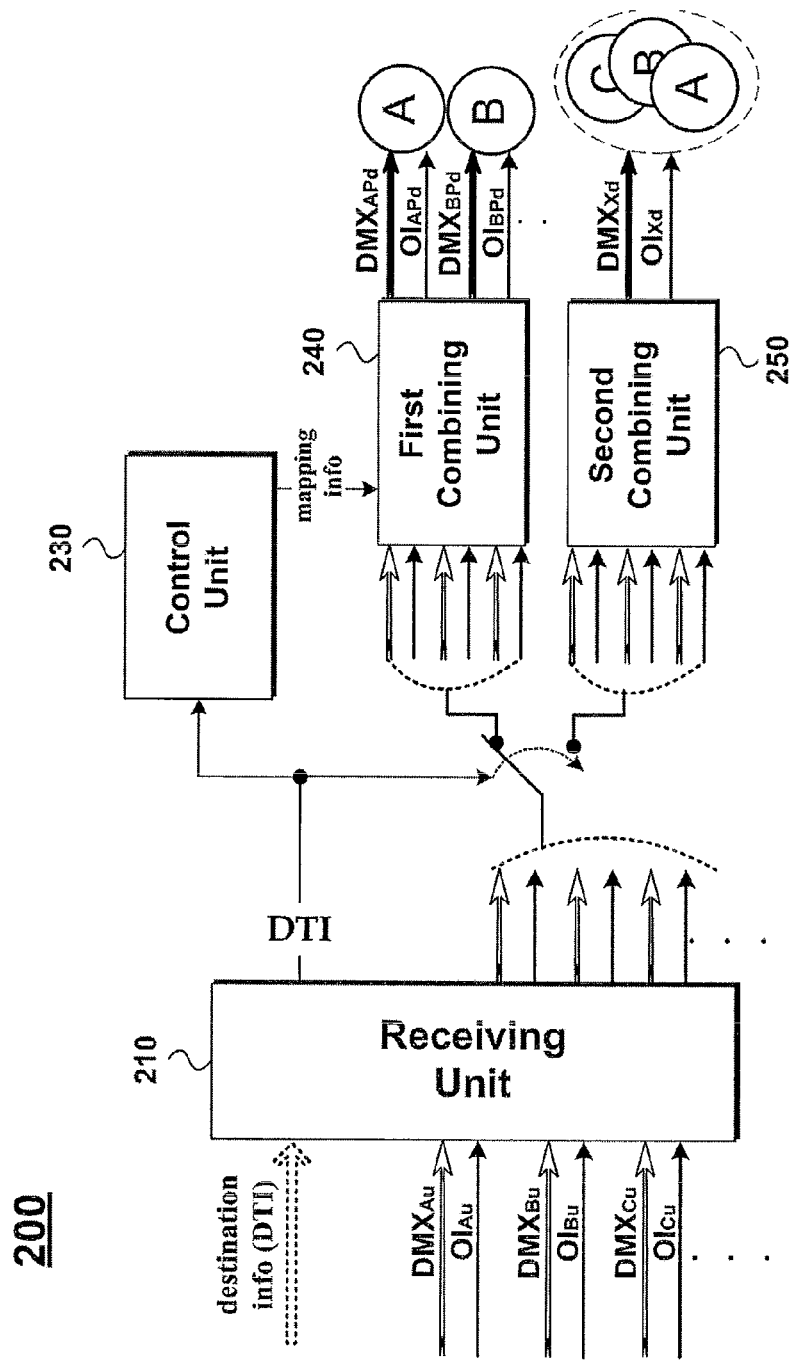
FIG. 4 is a block diagram of a multipoint control unit according to an embodiment of the present invention.
Figure 5:
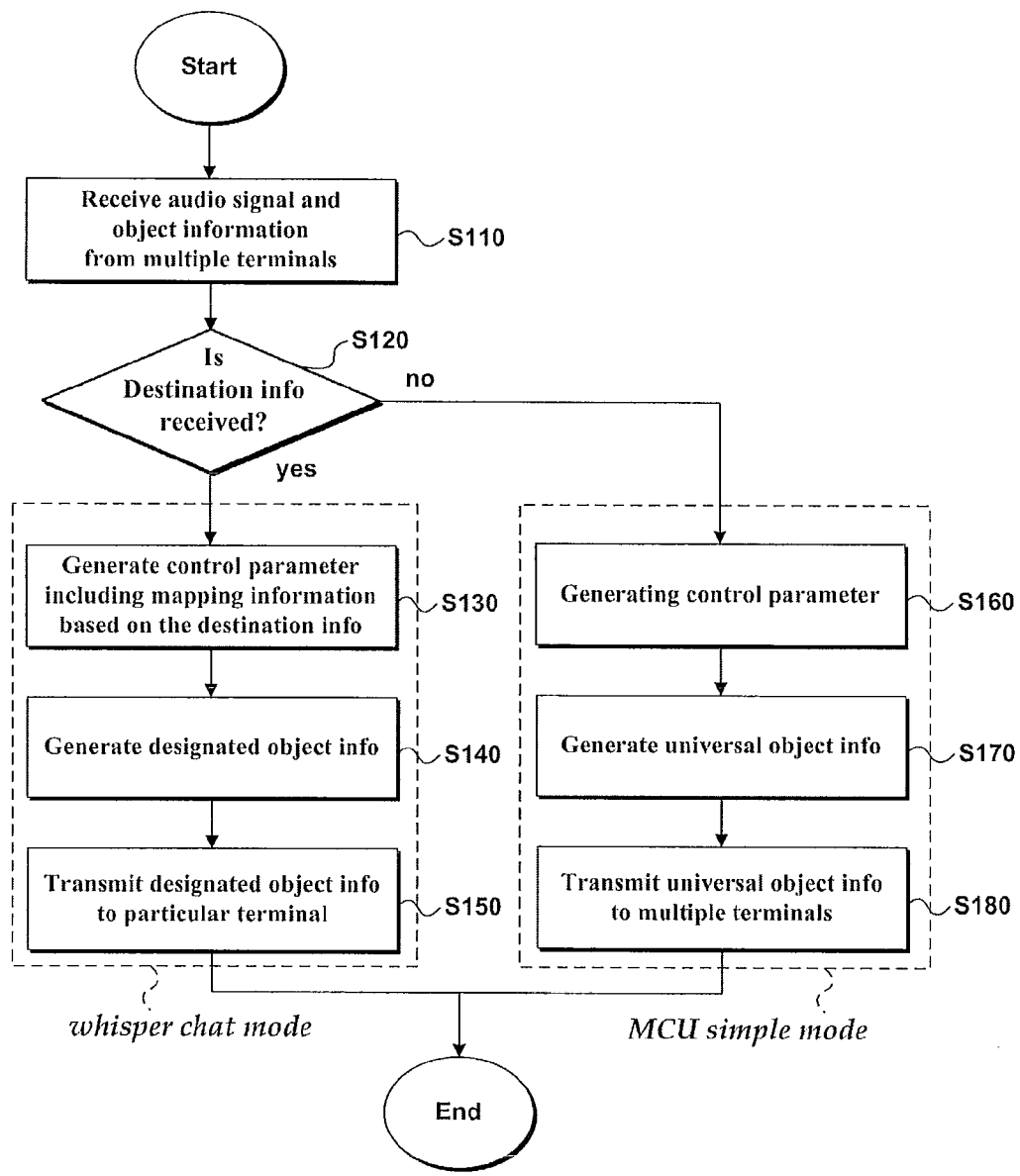
FIG. 5 is a flowchart for a method of processing an audio signal, which is performed by a multipoint control unit, according to an embodiment of the present invention.
Figure 6:
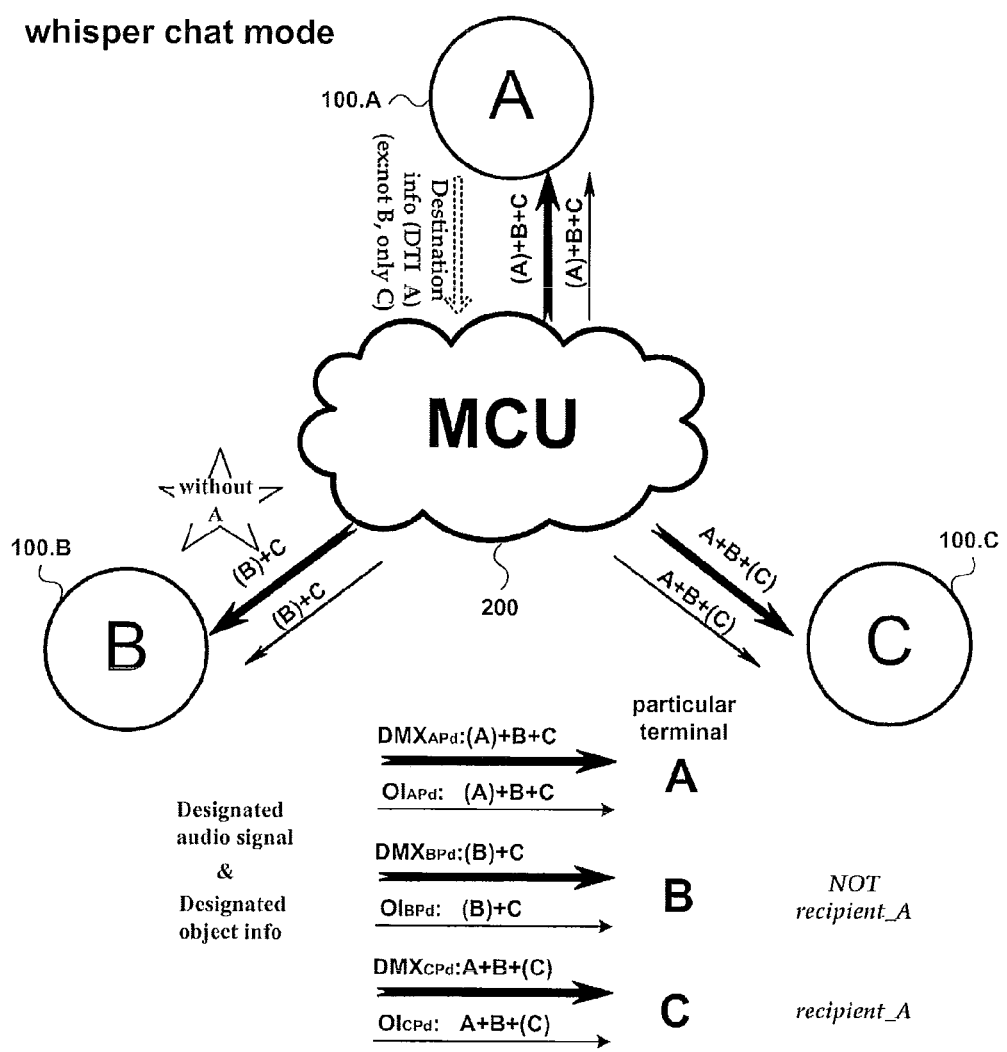
FIG. 6 is a diagram for a concept of a whisper chat mode according to an embodiment of the present invention.
Figure 7:
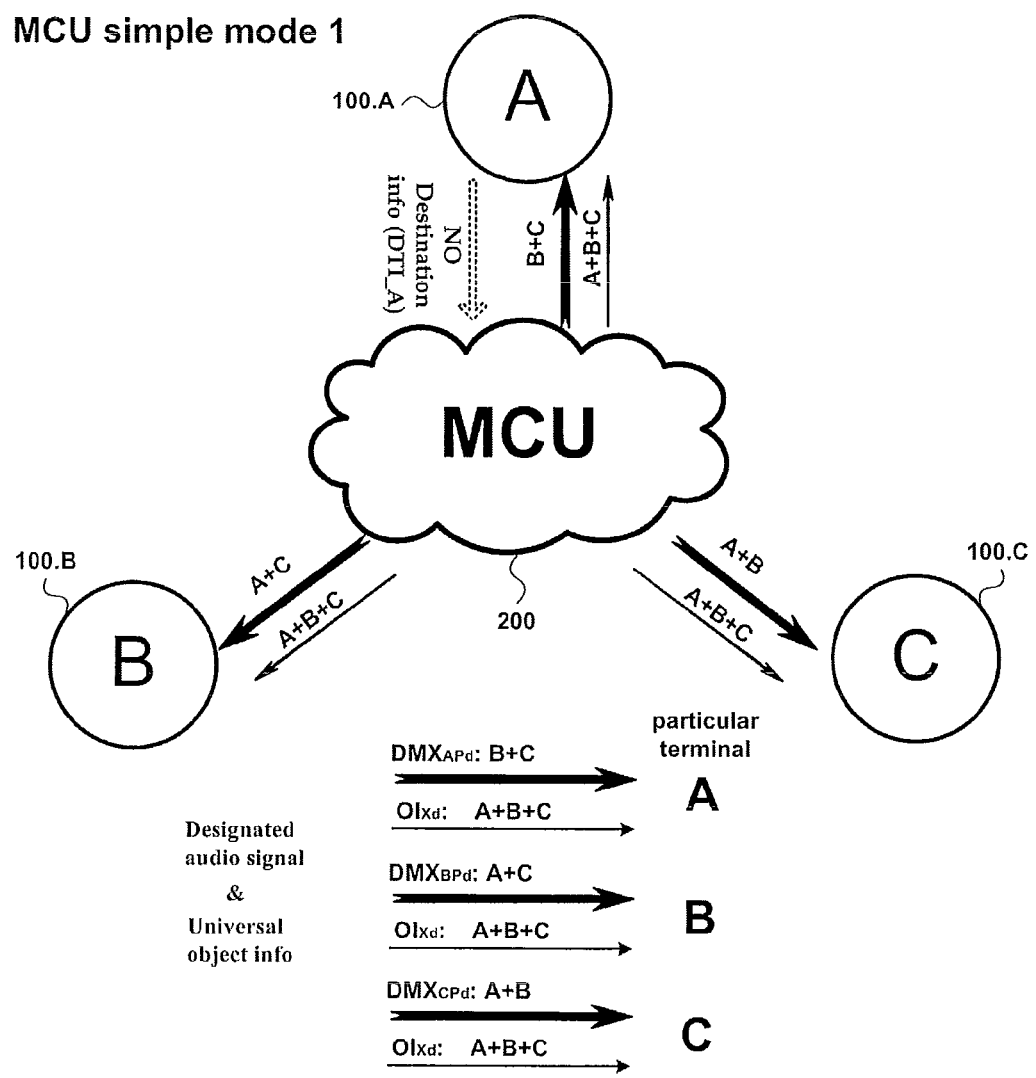
FIG. 7 is a diagram for an MCU simple mode according to an embodiment of the present invention.
Figure 8:
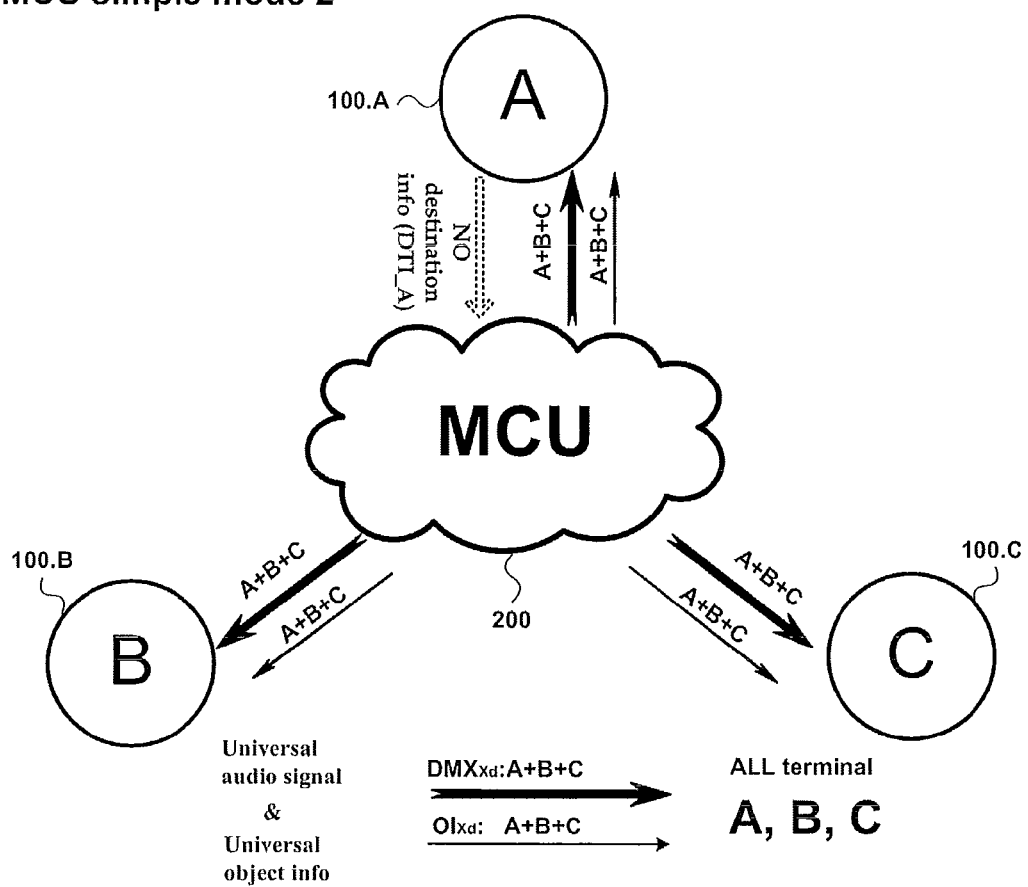
FIG. 8 is a diagram for an MCU simple mode according to another embodiment of the present invention.

FIG. 4 is a block diagram of a multipoint control unit according to an embodiment of the present invention and FIG. 5 is a flowchart for a method of processing an audio signal, which is performed by a multipoint control unit. FIG. 6 is a diagram for a concept of a whisper chat mode. And, FIG. 7 and FIG. 8 are diagram for first and second examples of an MCU simple mode according to an embodiment of the present invention, respectively.

A configuration of a multipoint control unit and an audio signal processing method are explained with reference to FIG. 4 and FIG. 5 as follows. First of all, referring to FIG. 4, a multipoint control unit 200 includes a receiving unit 110, a recipient determining unit 120, a control unit 130, a first combining unit 240 and a second combining unit 250. The multipoint control unit 200 may further include a third combining unit. The first combining unit 240 is a unit that is activated in case of a whisper chat mode. The second combining unit 250 is a unit that is activated in case of an MCU simple mode. The third combining unit can be activated instead of either the first combining unit 240 or the second combining unit 250, details of the third combining unit shall be explained later.

Referring to FIG. 4 and FIG. 5, the receiving unit 110 receives audio signals $DMX_{Au}$, $DMX_{Bu}$ and $DMX_{Cu}$ and object informations $OI_{Au}$, $OI_{Bu}$ and $OI_{Cu}$ from terminals A, B and C, respectively [S110]. The receiving unit 110 is able to receive destination information DTI (e.g., DTI_A: In case of terminal A) from at least one of the terminals [S120]. In this case, the destination information is the information for an originator terminal designates a specific one of multiple terminals to a recipient terminal. The destination information DTI can include at least one of positive destination information for designating a recipient terminal among multiple terminals and negative destination information for designating a non-recipient terminal among multiple terminals.

In case that at least one of the multiple terminals transmits the destination information, the multipoint control unit operates in the whisper chat mode. On the contrary, if multiple originator terminals do not transmit the destination information at all or the destination information designates the whole terminals, the multipoint control unit can operate in the MCU simple mode instead of the whisper chat mode.

So to speak, if the destination information DTI exists ['yes' in the step S120], the inputted audio signals $DMX_{Au}$, $DMX_{Bu}$ and $DMX_{Cu}$ and the inputted object informations $OI_{Au}$, $OI_{Bu}$ and $OI_{Cu}$ are transferred to the first combining unit 240. If the destination information DTI does not exist or designates all terminals ['no' in the step S120], the audio signals and object information are inputted to the second combining unit 250 instead of the first combining unit 240.

Meanwhile, the control unit 230 generates a control parameter for controlling the first/second combining unit 240/250 [S130/S160]. The control parameter can include mapping information, downmix combination information and downmix mode information. In this case, the mapping information is the information for determining a set and order of objects included in an output downmix. Particularly, the mapping information can be generated only if the whisper chat mode is activated [S130]. This will be explained in detail together with the first combining unit 240 later. The downmix combination information can include the information corresponding to a downmix gain applied to combining the audio signals received from the multiple terminals. For instance, in case of combining at least two of a first audio signal $DMX_{Au}$ received from the terminal A, a second audio signal $DMX_{Bu}$ received from the terminal B and a third audio signal $DMX_{Cu}$ received from the terminal C together, the downmix combination signal can correspond to a gain applied to each audio signal. Meanwhile, the downmix mode information is the information indicating whether an output audio signal of the multipoint control unit is a mono signal or a stereo signal. Thus, the control parameters generated by the control unit 230 are inputted to the first combining unit 240 and the second combining unit 250, respectively. According to this control parameter, combining of the audio signal and the object information is performed.

In case of the whisper chat mode according to the destination information DTI, the first combining unit 240 generates designated audio signals $DMX_{APd}$ and $DMX_{BPd}$ and designated object informations $OI_{APd}$ and $OI_{APd}$ by combing the audio signals and the object informations based on the control parameters [S140]. Subsequently, the designated audio signal and the object information are transmitted to the corresponding specific terminal [S150]. The designated audio signal is not one signal generated for multiple terminals but a signal differently generated for each specific terminal. And, designated object information is not single information generated for multiple terminals but the information differently generated for each specific terminal. Examples of the whisper chat and the designated object information are shown in FIG. 6.

Referring to FIG. 6, like the examples shown in FIG. 1 and FIG. 2, a multipoint control unit 200 is connected to terminals A to C 100.A, 100.B and 100.C via wire/wireless communications. The terminal A designates a recipient to the terminal C and is able to transmit destination information DTI_A excluding the terminal B to the multipoint control unit 200. In this case, the multipoint control unit 200 generates audio signals and designated object signals differently designated to the recipient terminals for audio signals and object informations transmitted to the terminals A, B and C, respectively. In particular, since the terminal B is not the recipient according to the destination information of the terminal A, the designated audio signal $DMX_{BPd}$ to be transmitted to the terminal B should exclude the audio signal $DMX_{Au}$ received from the terminal A. And, the designated object information for the terminal B should exclude the object information $OI_{Au}$ of the terminal A. Thus, the information indicating whether a specific audio signal and specific object information will be included in a designated audio signal and specific object information is the above-mentioned mapping information. For instance, if the terminal A does not designate the terminal B to a recipient according to the destination information DTI, the control unit 230 generates the mapping information for not mapping a signal and information transmitted from the terminal A to an audio signal and object information to be transmitted to the terminal B. The first combining unit 240 combines the audio signal and object information according to the instruction of the mapping information.

Meanwhile, the designated audio signal $DMX_{APd}$ and designated object information $OI_{APd}$ for the terminal A can exclude or include its signal $DMX_{Au}$ and information $OI_{Au}$. If a signal of an originator is included, a method for a terminal to exclude the signal by itself will be explained in the following description together with an MCU simple mode and an object decoder. Meanwhile, the designated audio signal $DMX_{CPd}$ and designated object information $OI_{Cd}$ for the terminal C can exclude or include a signal C and object information C.

In brief, regarding the designated object signal and the designated object information, an audio signal and object information to be transmitted to a receiving terminal differ according to whether the receiving terminal is designated to a recipient by an originating terminal. A different audio signal and object information are transmitted to the specific terminal [S150]. In the following description, an MCU simple mode is explained with reference to FIG. 4, FIG. 5, FIG. 7 and FIG. 8.

Referring now to FIG. 4, in case of corresponding to an MCU simple mode according to the destination information DTI ['no' in the step S120], the second combining unit 250 generates a universal audio signal $DMX_{Xd}$ and universal object information $OI_{Xd}$ by combining audio signals and object informations together based on the control parameter [S170]. As mentioned in the foregoing description, the MCU simple mode is activated if all terminals do not transmit the destination information DTI (or the destination information designates all terminals to recipients). In this case, the universal audio signal is not the signal generated differently for a specific terminal but one signal generated for multiple terminals. And, the universal object information is not the information generated differently for a specific terminal but one information generated for multiple terminals. Examples of the MCU simple mode and the universal object information are shown in FIG. 7 and FIG. 8.

FIG. 7 shows an example for generating universal object information and FIG. 8 shows an example for generating a universal audio signal as well as universal object information. The first example shall be named a first MCU simple mode and the second example shall be named a second MCU simple mode.

Referring to FIG. 7, like the cases shown in FIG. 1 and FIG. 2, a multipoint control unit 200 is connected to a terminal A, a terminal B and a terminal C. In case of a first MCU simple mode, an audio signal generates a designated audio signal lie a whisper chat mode (or a secret mode), whereas object information generates universal object information. In particular, an audio signal $DMX_{APd}$ transmitted to the terminal A combines B and C except its signal and an audio signal $DMX_{BPd}$ transmitted to the terminal B combines signals of A and C except its signal B. Meanwhile, regarding object information, in generating one object information same to all terminals, i.e., universal object information, universal object information $OI_{Xd}$ generated from combining information A, information B and information C together is transmitted to all the terminals A, B and C. Thus, in case of transmitting the universal object information $OI_{Xd}$, the terminal A should exclude the object information $OI_A$ corresponding to itself from the universal object information $OI_{Xd}$. This will be explained with reference to FIG. 9 later.

Meanwhile, referring to FIG. 8, it can be observed that a universal audio signal $DMX_{Xd}$ applicable in common to all terminals is generated as well as universal object information. In particular, the universal audio signal $DMX_{Xd}$ including all audio signals A, B and C is transmitted to the terminals A, B and C. Likewise, a decoder should exclude it signal. This will be explained with reference to FIG. 9 later.

Thus, the multipoint control unit including the elements shown in FIG. 4 performs the audio signal processing method described with reference to FIG. 5, thereby generating an audio signal in the whisper chat mode or the MCL simple mode from audio signals received from multiple terminals according to destination information and then transmitting the generated audio signal to each of the terminals.

Furthermore, the multipoint control unit may further comprise a third combining unit generating a designated audio signal and a designated object, and the third combining unit may be activated instead of the second combining unit 250 in case of non-whisper chat mode. The designated object information is generated by combining multiple object information regardless of designation of recipient terminal, by excluding audio signal of the recipient terminal itself from the designated object information. On the other hand, the third combining unit may be activated instead of the first combining unit 240 in case of non-MCU simple mode.

Figure 9:
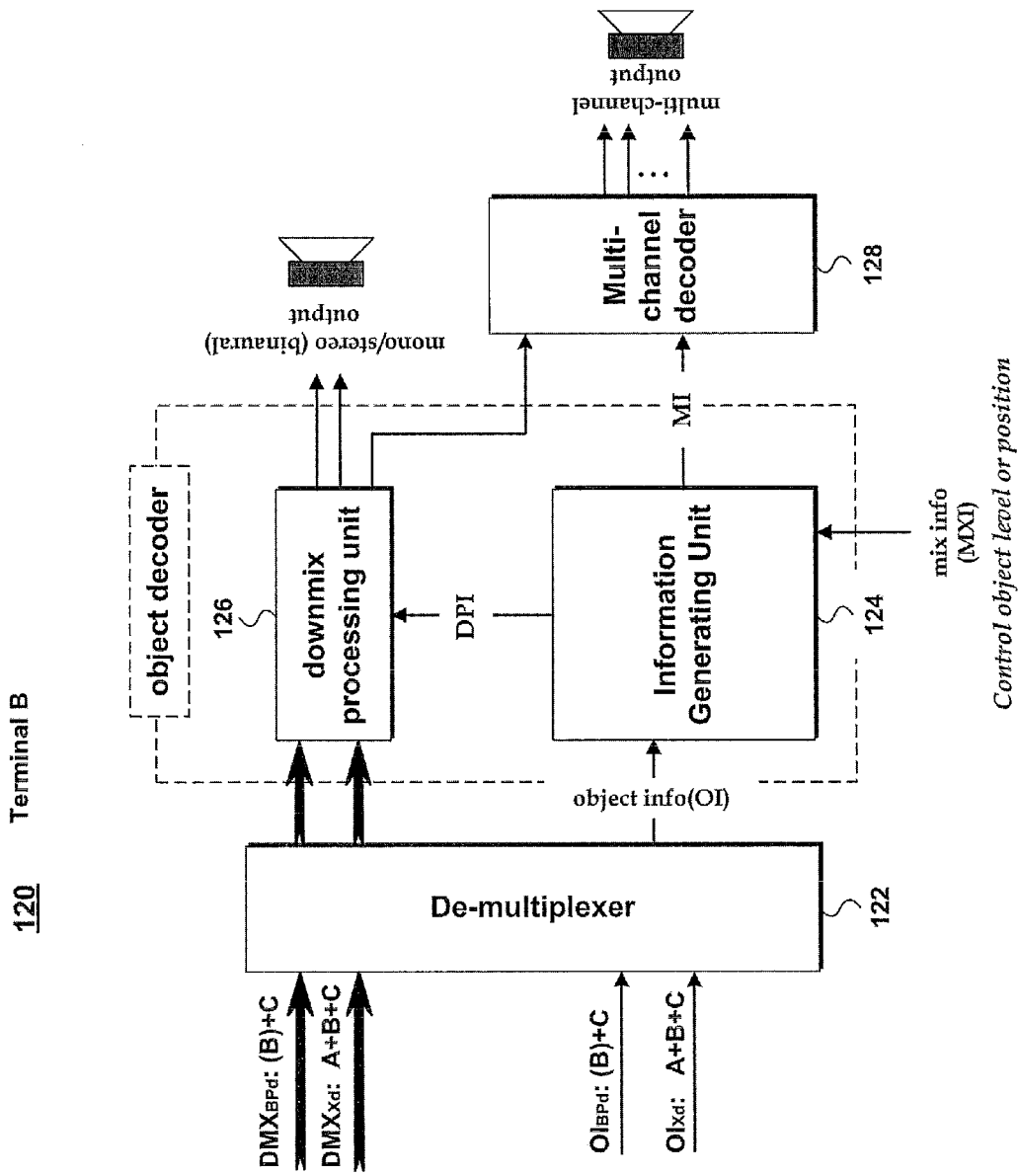
FIG. 9 is a block diagram of an object decoder according to an embodiment of the present invention.
Figure 10:
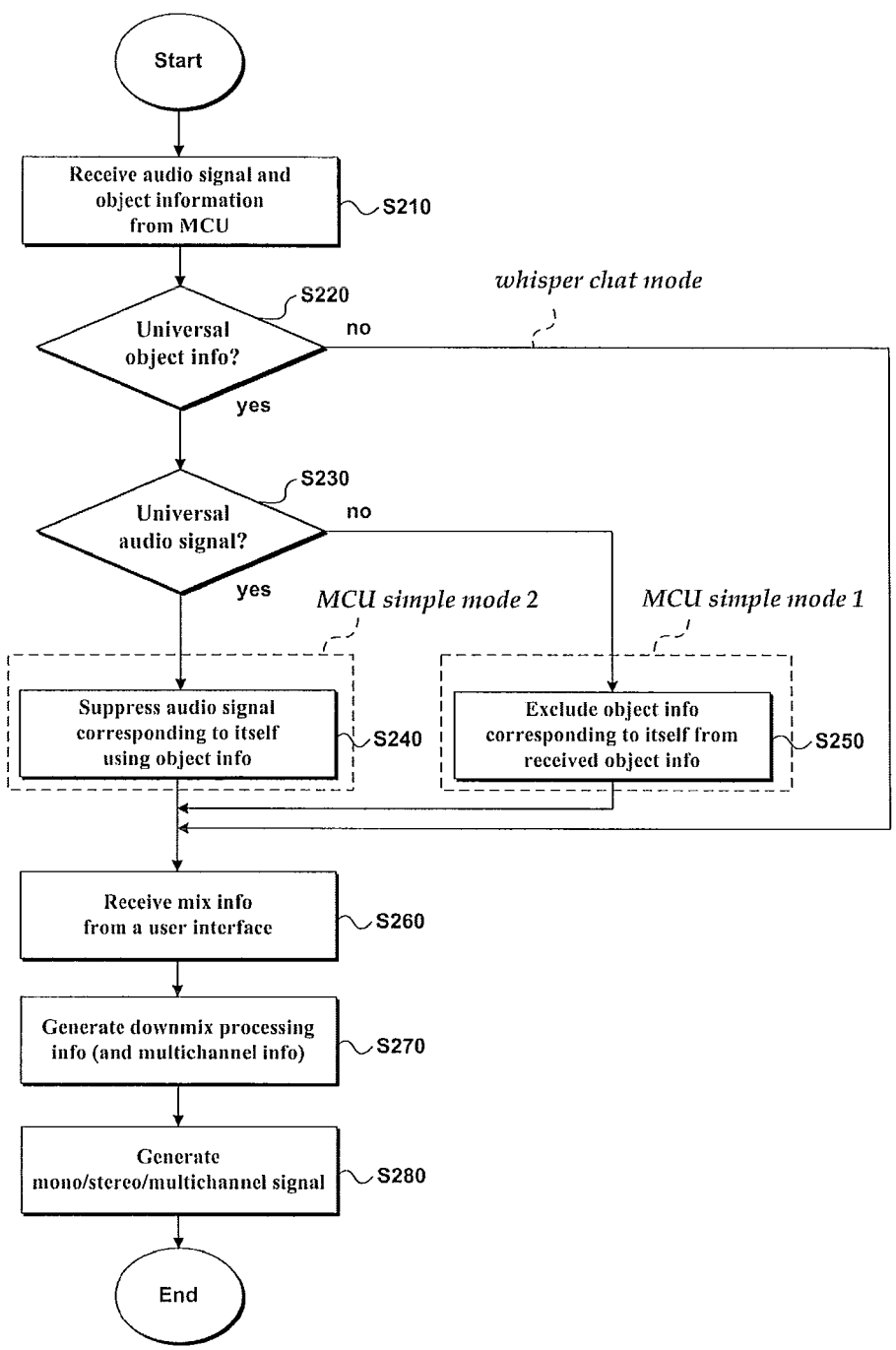
FIG. 10 is a flowchart for a method of decoding an audio signal, which is performed by an object decoder, according to an embodiment of the present invention.

FIG. 9 is a block diagram of an object decoder according to an embodiment of the present invention, and FIG. 10 is a flowchart for a method of decoding an audio signal, which is performed by an object decoder, according to an embodiment of the present invention.

First of all, referring to FIG. 9, object decoder 120 includes a information generating unit 124 and a downmix processing unit 126 and can further include a demultiplexer 122 and a multi-channel decoder 128. In this case, the demultiplexer 122 receives an audio signal and object information from a multipoint control unit [S210].

In this case, the object information can include designated object information $OI_{XPd}$ in case of a whisper chat mode or can include universal object information $OI_{Xd}$ in case of an MCL simple mode ['yes' of the step S220]. If the object decoder 120 is a terminal B and a terminal A designates the terminal B to a non-recipient, designated object information $OI_{BPd}$ for the terminal B can include object information C only. In this case, object information B can be included in or excluded from the designated object information $OI_{BPd}$ on the terminal B. Meanwhile, as mentioned in the foregoing description, if it is not a whisper chat mode (i.e., in case of a first MCU simple mode or a second MCU simple mode), universal object information $OI_{Xd}$ is generated. Hence, the universal object information $OI_{Xd}$ includes all of the object information A, the object information B and the object information C.

As mentioned in the foregoing description, the designated object information $OI_{XPd}$ includes object level information and object correlation information and can further include downmix gain information, downmix channel level difference and absolute object energy information if necessary. Meanwhile, the object information may include a result that the multipoint control unit presets a position and level (e.g., a voice volume of a speaker) corresponding to each object (i.e., a speaker) at each terminal. This will be explained with reference to FIG. 11.

Figure 11:
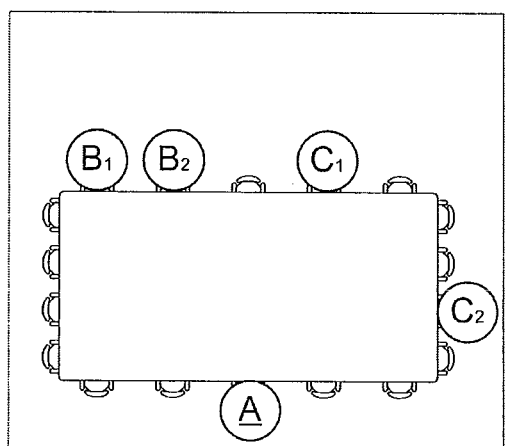
FIG. 11 is a diagram for an example of an interface displayed on a terminal A, B or C.
Figure 11:
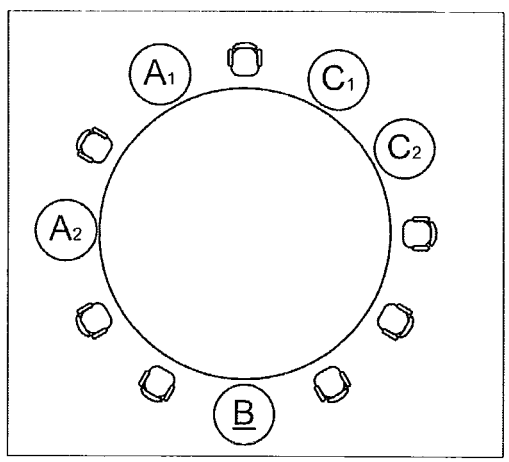
Figure 11:
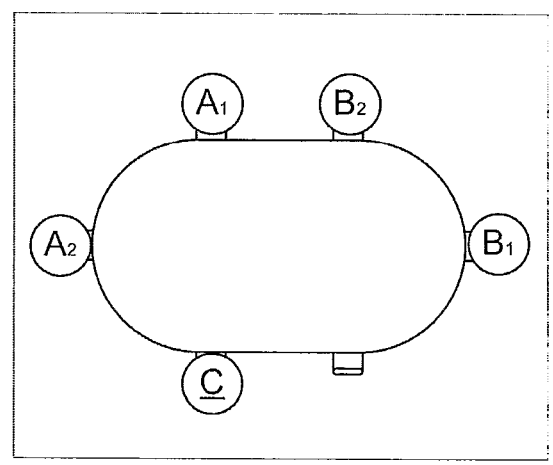

FIG. 11 is a diagram for an example of an interface displayed on a terminal A, B or C.

Referring to FIG. 11, an example of an image displayed on a terminal A is indicated by (A), an example of an image displayed on a terminal B is indicated by (B), and an example of an image displayed on a terminal C is indicated by (C). In particular, in case that each different designated object information is transmitted, a background displayed on each terminal and a corresponding position and level of an object may vary. In case of (A), mutual positions can be preset, as shown in the drawing, in a manner that speakers sit around a rectangular table in order of a speaker B1, a speaker B2, a speaker C1 and a speaker C2 with reference to A. According to an image displayed on the terminal B, a speaker A2, a speaker A1, a speaker C1 and a speaker C2 can be located around a round table, as shown in the drawing, in order with reference to B. In case of (C), a speaker A2, a speaker A1, a speaker B2 and a speaker B1 can be arranged around an oval table, as shown in the drawing, in order with reference to C.

In case of designated object information $OI_{XPd}$, different images can be displayed, as shown in (A), (B) and (C) of FIG. 11, on the terminals, respectively. On the contrary, in case of universal object information $OI_{Xd}$, it is a matter of course that the same image (e.g., the image shown in (A) of FIG. 11) is displayed on each of the terminals.

Referring now to FIG. 10, the audio signal received in the step S210 may include a designated audio signal $DMX_{BPd}$ or a universal audio signal $DMX_{Xd}$. As mentioned in the foregoing description, in case of the whisper chat mode or the first MCU simple mode, the designated audio signal $DMX_{BPd}$ is received. In case of the second MCU simple mode, the universal audio signal $DMX_{Xd}$ is received.

In brief, three cases are possible. The three cases includes 1) a designated audio signal and designated object information (whisper chat mode), 2) a designated audio signal and universal object information (first MCU simple mode), and 3) a universal audio signal and universal object information (second MCU simple mode). In case that a universal audio signal is received, a universal object is always received instead of designated object information. Thus, decoding needs to differ in each of the three cases. This will be explained together with the information generating unit 124.

In the case 1), i.e., in case that designated object information and a designated audio signal are received ['no' in the step S220 or 'no' in the step S230], the information generating unit 124 goes to a step S260 directly instead of performing the step S240 and the step S250. Mix information MXI is received from a user interface (or a device setting information). In this case, the mix information MXI is the information generated based on object position information, object gain information, playback configuration information and the like. The object position information is the information inputted by a user to control a position or panning of each object. The object gain information is the information inputted by a user to control a gain of each object. The concept of controlling the position or panning of object will be explained with reference to FIG. 12 as follows.

Figure 12:
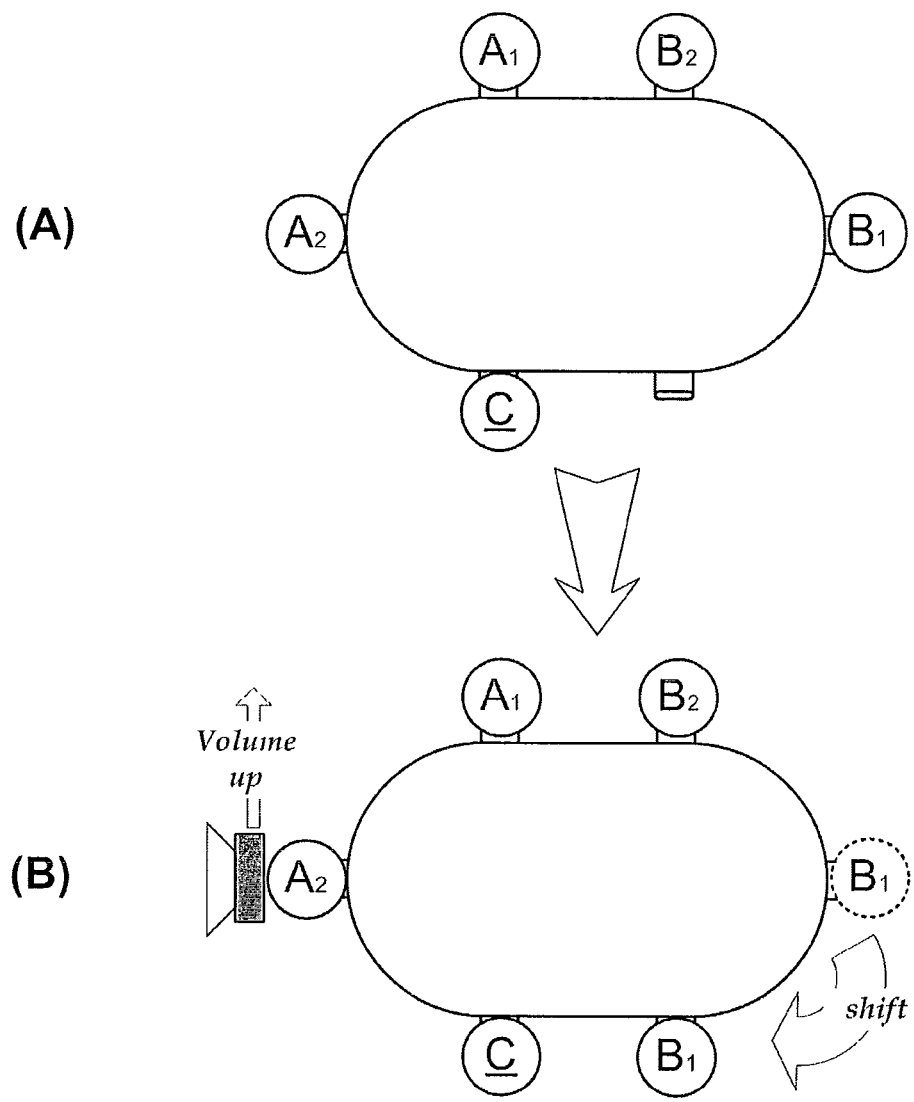
FIG. 12 is a diagram for a concept of controlling a level and position of a chat correspondent party.

FIG. 12 is a diagram for a concept of controlling a level and position of a chat correspondent party. Referring to FIG. 12, an image shown in (A) of FIG. 12 can be displayed on a terminal C in the same manner shown in (C) of FIG. 11. Referring to (B) of FIG. 12, a user in the image shown in (A) of FIG. 12 raises a volume of a specific speaker A2 and is able to move a virtual position of a specific speaker B1 to a closer position. Thus, the user is able to adjust a volume and position of each correspondent chat party by inputting mix information.

Meanwhile, object position information and object gain information of mix information may include one selected from preset modes. In this case, the preset mode is a value for predetermining a specific gain and position of object according to time. The preset mode information may include a value received from another device or a value stored in a device. Meanwhile, the selection for one from at least one or more preset modes (e.g., preset mode not used, preset mode 1, preset mode 2, etc.) can be determined by a user input.

Referring now to FIG. 9 and FIG. 10, as mentioned in the foregoing description, the information generating unit 124 receives the mix information MXI if the designated object information and the designated audio signal are received ['no' in the step S220 and the step S230] [whisper chat mode] [S260], and then generates downmix processing information (DPI) (and multi-channel information MI) using the mix information MXI and the designated object information $OI_{BPd}$ [S270]. In particular, if an output mode is mono/stereo/binaural, the information generating unit 124 generates downmix processing information DPI. On the other hand, when an output mode is a multi-channel mode, if an input signal is mono, the information generating unit 124 generates multi-channel information MI only. If an input signal is a stereo signal, the information generating unit 124 generates downmix processing information DPI and multi-channel information MI both. In this case, the downmix processing information DPI is the information for processing a downmix signal (i.e., an inputted designated audio signal or universal audio signal) to control gains and/or pannings of objects included in a downmix signal.

In this case, the multi-channel information MI is the information for upmixing a downmix signal DMX and can include channel level information, channel correlation information and the like.

Furthermore, the downmix processing information DPI can include a binaural parameter. In this case, the binaural parameter is a parameter for 3D effect and can include the information generated by the information generating unit 120 using object information OI, mix information MXI and HRTF parameter. If the downmix processing information DPI includes the binaural parameter, the downmix processing unit 130 is able to output a binaural signal.

The downmix processing unit 126 processes a downmix signal (a designated audio signal or a universal audio signal) based on the downmix processing information DPI. In particular, if an output mode is mono/stereo/binaural, the downmix processing unit 126 outputs a signal (e.g., PCM signal) in a time domain [S280]. Meanwhile, if an output mode is a multi-channel, a mono input signal bypasses the downmix processing unit 126. If an output mode is a multi-channel, the downmix processing unit 126 processes a stereo input signal based on the downmix processing information DPI and then delivers the processed downmix to the multi-channel decoder 128.

In case of a multi-channel output mode, the multi-channel decoder 128 generates a multi-channel signal by upmixing the bypassed or processed signal from the downmix processing unit 126 using the multi-channel information MI [S280]. The multi-channel decoder 140 can be implemented according to the standard of MPEG surround (ISO/IEC 23003-1), by which the present invention is non-limited.

Meanwhile, the case of receiving the universal object information and the designated audio signal (i.e., 'no' in the step S220, 'n' in the step S230) is the second case among the former enumerated cases) and just corresponds to the first MCU simple mode. In this case, since a terminal does not need object information corresponding to itself, the terminal excludes or ignores the object information corresponding to itself [S250]. A method of identifying object information corresponding to a terminal itself can be performed in various ways. In case of a terminal D, if the number of objects of a terminal A is 2, the number of objects of a terminal B is 3, the number of objects of a terminal C is 4, and the number of objects of a terminal D is 3, the transmitted object information indicates that the number of objects is 12. And, it is able to exclude three objects transmitted from the D from the 12 objects. In this case, the object information on the object number of the received object information is ignored and may not be used for decoding. In order to identify the transmitted object information, an object order performed by the multipoint control unit is used, metadata can be referred to, or terminal information or originator information on the objects combined in combination can be included in the object information.

Meanwhile, the case of receiving the universal object information and the universal audio signal ['yes' in the step S220, 'yes' in the step S230] is the case corresponding to the first MCU simple mode. In this case, using object information corresponding to itself in the universal object information, an audio signal corresponding to itself in the universal audio signal is suppressed [S240]. For the case of the terminal A, a corresponding example is the case of receiving a universal audio signal including a signal A and object information including object information A. In this case, since the object information A is the information for controlling objects included in the signal A, it is able to suppress all objects included in the audio signal by setting a rendering matrix corresponding to the object information A to 0.

Meanwhile, instead of the step S240 of using the object information, it is able to remove its signal from the universal audio signal in a manner of storing its audio signal in a buffer and then deducting its audio signal from the universal audio signal.

The object decoder performs the above steps within the above configuration, thereby adaptively decoding an audio signal in each of a whisper chat mode, a first MCU simple mode and a second MCU simple mode.

Figure 13:
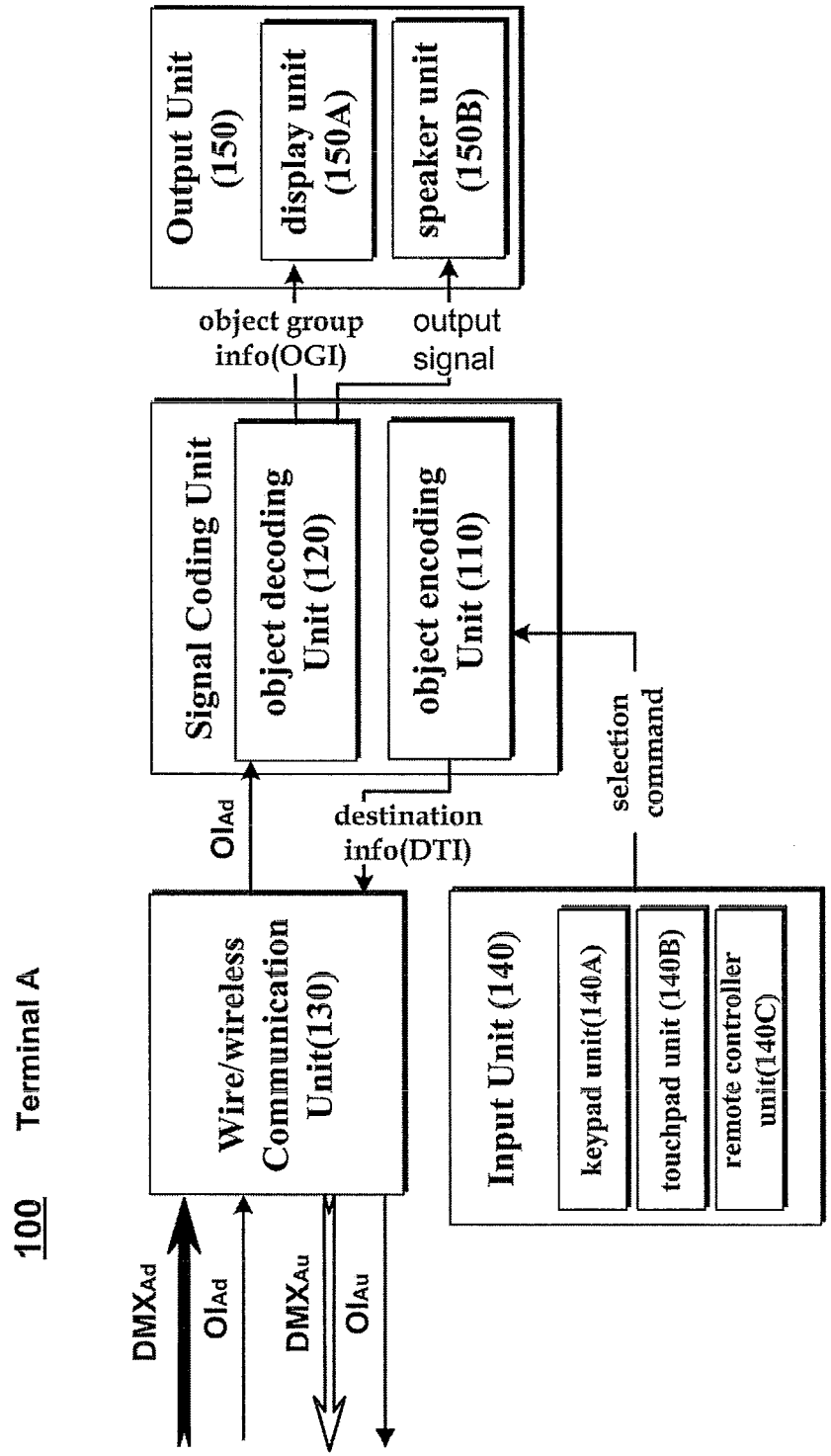
FIG. 13 is a diagram for terminal according to an embodiment of the present invention.
Figure 14:
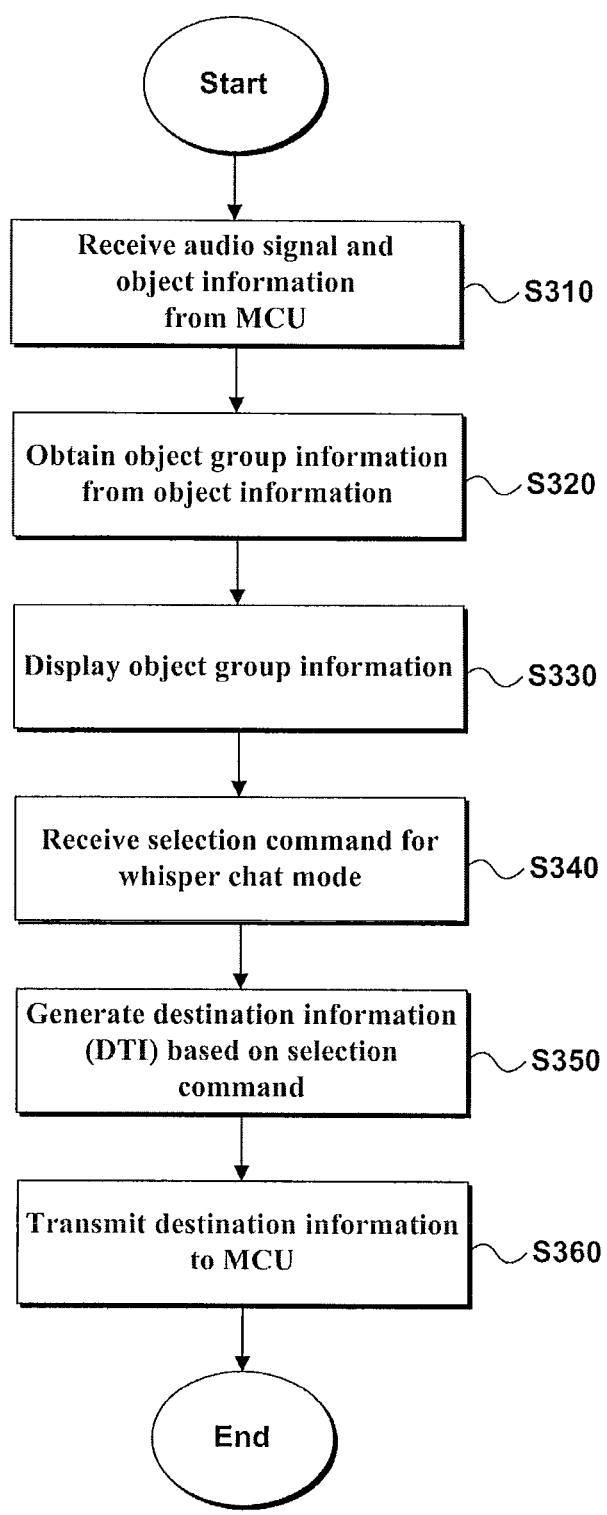
FIG. 14 is a flowchart for a method of processing a signal, which is performed by a terminal, according to an embodiment of the present invention.
Figure 15:
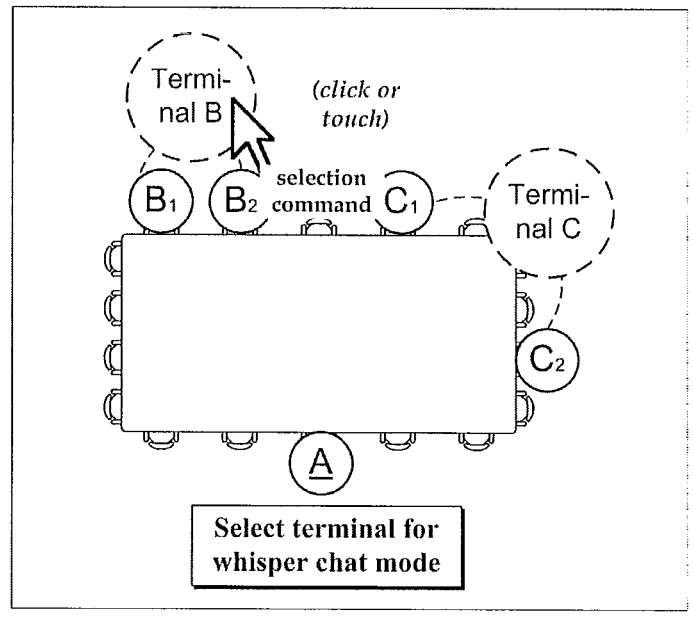
FIG. 15 is a diagram for an example of an interface displayed on a terminal in case that whisper chat mode is activated.
Figure 15:
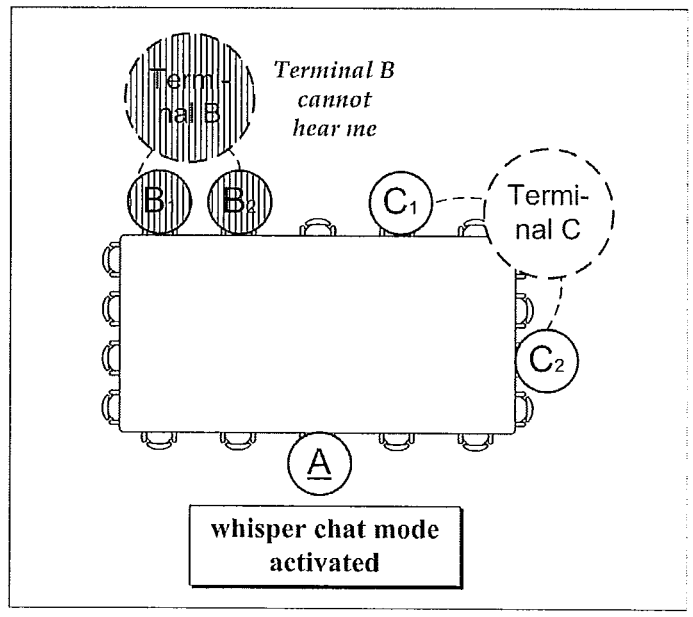

FIG. 13 is a diagram for terminal according to an embodiment of the present invention, and FIG. 14 is a flowchart for a method of processing a signal, which is performed by a terminal, according to an embodiment of the present invention, and FIG. 15 is a diagram for an example of an interface displayed on a terminal in case that whisper chat mode is activated.

Referring to FIG. 13 and FIG. 14, terminal according to the present invention 100 may include a signal coding unit with object decoding unit 120 and object encoding unit 110, a wire/wireless communication unit 130, an input unit 140, and an output unit 150. The object decoding unit 120 may comprises elements explained in detail with reference to FIG. 9, and the object encoding unit 110 may comprises elements explained in detail with reference to FIG. 3.

The wire/wireless communication unit 130 receives object information $OI_{Ad}$ and an audio signal $DMX_{Ad}$ which comprises multiple object groups from multipoint control unit [S310]. The object information $OI_{Ad}$ corresponds to either designated object information or universal object information. The audio signal $DMX_{Ad}$ corresponds to either a designated audio signal or universal audio signal. Details of the designated object information, the designated audio signal, the universal object information, and the universal audio signal are explained with reference to FIG. 4 to FIG. 8.

An object decoding unit 120 can be configured to obtain object group information (OGI) by decoding the object information $OI_{Ad}$ [S320]. The object group information (OGI) can be present in a metadata area of the object information $OI_{Ad}$. Meanwhile, the object group information (OGI) comprises terminal name of the first terminal, object name of at least one object included in the first object group, and terminal name of the second terminal, object name of at least one object included in the second object group. Meanwhile, object decoding unit 120 generates output signal based on a mix information and audio signal $DMX_{Ad}$, and a speaker unit 150B of the output unit 150 reproduces the output signal from the object decoding unit 120.

A display unit 150A of the output unit 150 display the object group information (OGI) received from the object decoding unit 120 [S330]. Referring to (A) of FIG. 15, it can be observed that interface displayed on terminal A represents terminal name of terminal B, object name $B_1$ and object name $B_2$ included in the terminal B.

A user can input selection command designating at least one object group as non-recipient terminal among multiple object groups, after confirming the object group information via input unit 140 [S340]. The selection command may be performed by clicking/touching on particular area using pointing devices 140B or by pressing key using keyboard unit 140A or remote controller unit 140C. Referring to (A) of FIG. 15, it is observed that a user inputs selection command by clicking/touching an area displayed 'Terminal B' using mouse pointer or finger.

An object encoding unit 110 may generates destination information (DTI) based on the selection command [S350]. The destination information (DTI) can designate at least one non-recipient terminal among multiple terminals, wherein each terminal corresponds to each object group which comprises at least one object signal.

The wire/wireless communication unit 130 transmits not only uplink object information $OI_{Au}$ and uplink audio signal $DMX_{Au}$, but also the destination information when the destination information is generated by the object encoding unit 110.

A multipoint control unit can be configured to transmit a designated object information without the uplink object information of the terminal 100 to non-recipient terminal based on the destination information (DTI), so that non-recipient terminal designated by destination information of terminal 100 cannot reproduce audio signal of the terminal 100. Referring to (B) of FIG. 15, it is observed that terminal B cannot hear audio signal terminal A.

Figure 16:
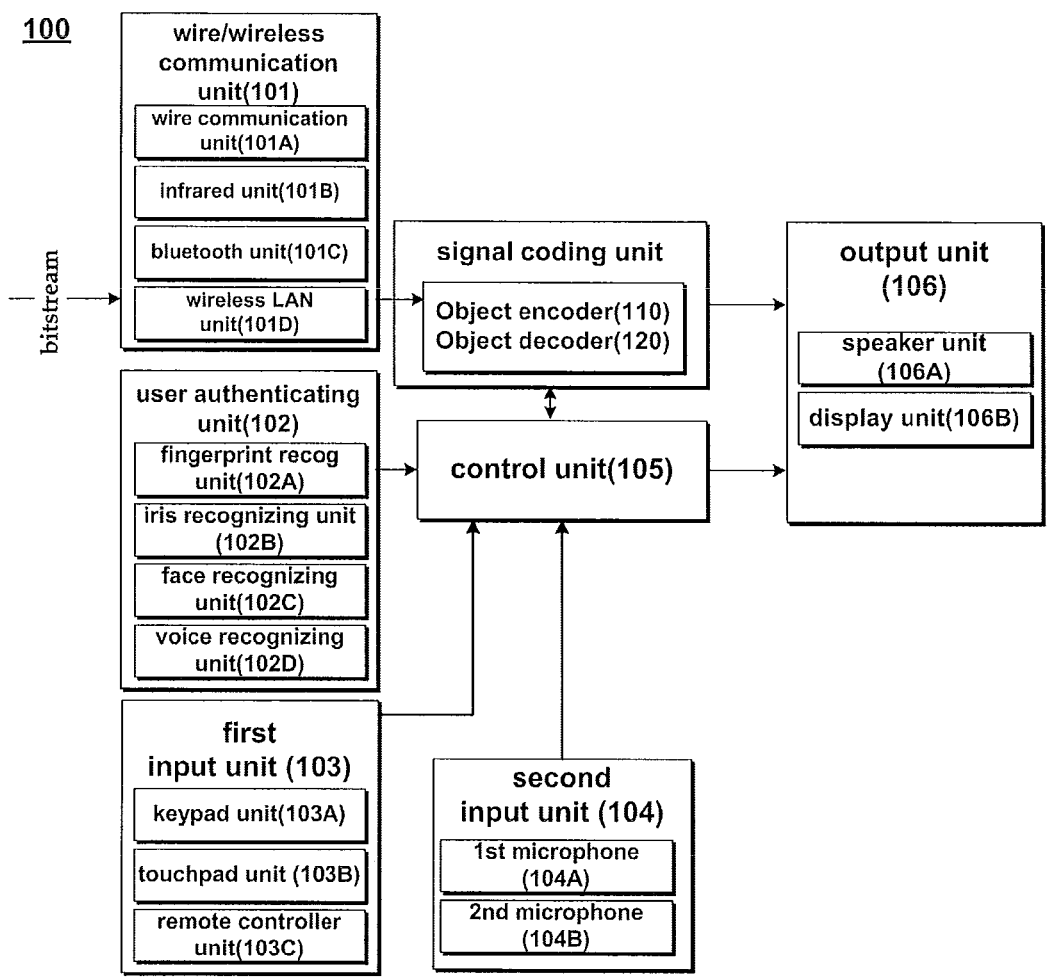
FIG. 16 is a schematic block diagram of a product in which an object encoder and decoder according to an embodiment of the present invention are implemented.

FIG. 16 is a schematic block diagram of a product in which an object encoder and decoder according to an embodiment of the present invention are implemented. Referring to FIG. 16, a wire/wireless communication unit 101 receives a bitstream via wire/wireless communication system. In particular, the wire/wireless communication unit 101 can include at least one of a wire communication unit 101A, an infrared communication unit 101B, a Bluetooth unit 101C and a wireless LAN unit 101D.

A user authenticating unit 102 receives an input of user information and then performs user authentication. The user authenticating unit 102 can include at least one of a fingerprint recognizing unit 102A, an iris recognizing unit 102B, a face recognizing unit 102C and a voice recognizing unit 102D. The fingerprint recognizing unit 102A, the iris recognizing unit 102B, the face recognizing unit 102C and the voice recognizing unit 102D receive fingerprint information, iris information, face contour information and voice information and then convert them into user informations, respectively. Whether each of the user informations matches pre-registered user data is determined to perform the user authentication.

A first input unit 103 is an input device enabling a user to input various kinds of commands and can include at least one of a keypad unit 103A, a touchpad unit 103B and a remote controller unit 103C, by which the present invention is non-limited.

A second input unit 104 may comprise at least one microphone for receiving audio signal (speech signal, music signal, and so on). A first microphone 104A may be configured to receive a first object signal of first dialogist, and second microphone 104B may be configured to receive a second object signal of second dialogist.

A signal coding unit can include the terminal described with reference to FIG. 1 and the like and can include an object encoder 110 and an object decoder 120. The object encoder 110 includes the former configuration shown in FIG. 3 and the object decoder 120 can include the former configuration shown in FIG. 9.

A control unit 105 receives input signals from input devices and controls all processes of the signal coding unit 110 and 120 and an output unit 106. In particular, the output unit 106 is an element configured to output an output signal generated by the signal coding unit 110 and 120 and the like and can include a speaker unit 106A and a display unit 106B. If the output signal is an audio signal, it is outputted to a speaker. If the output signal is a video signal, it is outputted via a display.

Accordingly, the present invention provides the following effects and/r advantages.

First of all, the present invention enables a recipient to control a level and virtual position of a speech signal per originator terminal in a teleconference, thereby performing the teleconference with reality.

Secondly, if there are at least two correspondent chart parties using the same transmitting terminal, the present invention controls a volume and position per correspondent chat party (i.e., an object), thereby implementing virtual reality in teleconference.

Thirdly, in an object coding based teleconference, the present invention performs a whisper chat mode capable of designating a receiving terminal, thereby maintaining security for a secret or private chat.

Fourthly, instead of generating audio signals in proportion to the number of receiving terminals, the present invention generates one audio signal and object information irrespective of the number of the receiving terminals, thereby reducing a quantity of an operation performed by a multipoint control unit considerably.

An audio signal processing method according to the present invention can be implemented in a program recorded medium as computer-readable codes. And, multimedia data having a data structure according to the present invention can be stored in a computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the encoding method is stored in the computer-readable recording medium or can be transmitted via wire/wireless communication network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for processing an audio signal by an apparatus, the method comprising:
    receiving, by the apparatus, a first audio signal and first object information from a first terminal;
    receiving, by the apparatus, a second audio signal and second object information from a second terminal;
    receiving, by the apparatus, a third audio signal and third object information from a third terminal;
    when destination information designating at least one non-recipient terminal among multiple terminals including the second terminal and the third terminal is received from the first terminal,
        generating, by the apparatus, a designated object information for the at least one non-recipient terminal by combining multiple object information without the first object information according to the destination information, and
        generating, by the apparatus, a designated downmix signal for the at least one non-recipient terminal by combining multiple downmix signals without the first audio signal according to the destination information; and
    when the designated object information is generated, transmitting, by the apparatus, the designated object information and the designated downmix signal to the at least one non-recipient terminal among the multiple terminals,
    wherein the designated object information includes at least one of object level information, object correlation information, downmix gain information, downmix channel level difference, and absolute object energy information,
    wherein the designated object information is used to generate downmix processing information with mix information, wherein the mix information is transmitted to the at least one non-recipient terminal for controlling a position or panning of objects in the designated downmix signal, and
    wherein the designated downmix signal is processed with the generated downmix processing information.

2. The method of claim 1,
    wherein the first audio signal comprises a first object group including at least one object signal,
    wherein the first object information is generated when the first object group is downmixed into the first audio signal, and
    wherein the first object information comprises the at least one of object level information, object correlation information, downmix gain information, downmix channel level difference, and absolute object energy information.

3. The method of claim 1, further comprising:
    when the destination information is not received from the first terminal,
        generating a universal object information for the multiple terminals by combining multiple object information including the first object information, the second object information and the third object information, and
        generating a universal audio signal by combining multiple audio signals including the first audio signal, the second audio signal and the third audio signal; and
    transmitting the universal downmix signal and the universal audio signal to the multiple terminals.

4. The method of claim 1, further comprising:
    generating control parameter comprising at least one of downmix combination information, mapping information and downmix mode information,
    wherein the designated object information and the universal object information are generated based on the control parameter.

5. An apparatus for processing an audio signal, comprising:
    a receiving unit configured to
        receive a first audio signal and first object information from a first terminal, receive a second audio signal and second object information from a second terminal, and receive a third audio signal and third object information from a third terminal; and a first combining unit configured to when destination information designating at least one non-recipient terminal among multiple terminals including the second terminal and the third terminal is received from the first terminal, generate a designated object information for the at least one non-recipient terminal by combining multiple object information without the first object information according to the destination information, and generate a designated downmix signal for the at least one non-recipient terminal by combining multiple downmix signals without the first audio signal according to the destination information, and transmit the designated object information to the at least one non-recipient terminal among the multiple terminals, wherein the designated object information includes at least one of object level information, object correlation information, downmix gain information, downmix channel level difference, and absolute object energy information, wherein the designated object information is used to generate downmix processing information with mix information, wherein the mix information is transmitted to the at least one non-recipient terminal for controlling a position or panning of objects in the designated downmix signal, and wherein the designated downmix signal is processed with the generated downmix processing information.

6. The apparatus of claim 5, wherein the first audio signal comprises a first object group including at least one object signal, wherein the first object information is generated when the first object group is downmixed into the first audio signal, and wherein the first object information comprises the at least one of object level information, object correlation information, downmix gain information, downmix channel level difference, and absolute object energy information.

7. The apparatus of claim 5, further comprising:

a second combining unit configured to, when the destination information is not received from the first terminal, generate a universal object information for the multiple terminals by combining multiple object information including the first object information, the second object information and the third object information, and generate a universal audio signal by combining multiple audio signals including the first audio signal, the second audio signal and the third audio signal, the second combining unit further configured to transmit the universal downmix signal and the universal audio signal to the multiple terminals.

8. The apparatus of claim 5, further comprising:

a control unit configured to generate control parameter comprising at least one of downmix combination information, mapping information and downmix mode information, wherein the designated object information and the universal object information are generated based on the control parameter.

9. A computer-readable medium comprising instructions stored thereon, which, when executed by a processor, causes the processor to perform operations, the instructions comprising:

receiving a first audio signal and first object information from a first terminal;

receiving a second audio signal and second object information from a second terminal;

receiving a third audio signal and third object information from a third terminal;

when destination information designating at least one non-recipient terminal among multiple terminals including the second terminal and the third terminal is received from the first terminal, generating a designated object information for the at least one non-recipient terminal by combining multiple object information without the first object information according to the destination information, and generating a designated downmix signal for the at least one non-recipient terminal by combining multiple downmix signals without the first audio signal according to the destination information; and when the designated object information is generated, transmitting the designated object information and the designated downmix signal to the at least one non-recipient terminal among the multiple terminals, wherein the designated object information includes at least one of object level information, object correlation information, downmix gain information, downmix channel level difference, and absolute object energy information, wherein the designated object information is used to generate downmix processing information with mix information, wherein the mix information is transmitted to the at least one non-recipient terminal for controlling a position or panning of objects in the designated downmix signal, and wherein the designated downmix signal is processed with the generated downmix processing information.

* * * * *